United States Patent
Henry

(10) Patent No.: US 10,005,626 B2
(45) Date of Patent: Jun. 26, 2018

(54) VACUUM LAUNDRY CHUTE SYSTEM

(71) Applicant: Drew P. Henry, Oroville, CA (US)

(72) Inventor: Drew P. Henry, Oroville, CA (US)

(*) Notice: Subject to any disclaimer, the term of this patent is extended or adjusted under 35 U.S.C. 154(b) by 0 days. days.

(21) Appl. No.: 15/356,318

(22) Filed: Nov. 18, 2016

(65) Prior Publication Data
US 2017/0137234 A1    May 18, 2017

Related U.S. Application Data

(60) Provisional application No. 62/257,047, filed on Nov. 18, 2015.

(51) Int. Cl.
*B65G 51/16* (2006.01)
*B65G 51/02* (2006.01)

(52) U.S. Cl.
CPC ...... *B65G 51/02* (2013.01); *B65G 2201/0229* (2013.01)

(58) Field of Classification Search
None
See application file for complete search history.

(56) References Cited

U.S. PATENT DOCUMENTS

| | | | |
|---|---|---|---|
| 1,820,262 A | 8/1931 | Wilkinson | |
| 2,556,058 A * | 6/1951 | Boon | B65G 53/60 406/168 |
| 2,992,858 A * | 7/1961 | Pendleton | B01J 4/001 406/168 |
| 3,249,389 A | 5/1966 | Lemon et al. | |
| 3,490,813 A | 1/1970 | Hallstom | |
| 3,574,409 A | 4/1971 | Furstenberg | |
| 3,813,127 A | 5/1974 | De Feudis | |
| 3,829,165 A | 8/1974 | Boon | |
| 3,951,461 A | 4/1976 | De Feudis | |
| 4,013,551 A | 3/1977 | De Feudis | |
| 4,076,321 A | 2/1978 | Haight et al. | |
| 4,194,859 A * | 3/1980 | Boon | B65G 53/60 406/172 |

(Continued)

FOREIGN PATENT DOCUMENTS

| EP | 1820758 B1 | 8/2007 |
|---|---|---|
| EP | 1857386 B1 | 11/2007 |
| EP | 2042455 A1 | 4/2009 |

OTHER PUBLICATIONS

PCT/US2016/062930, Notification of Transmittal of the International Search Report and the Written Opinion of the International Searching Authority, or the Declaration, Mar. 31, 2017, pp. 15.

*Primary Examiner* — William R Harp

(57) ABSTRACT

A vacuum laundry chute system is disclosed. The system includes a receptacle, at least one chute, and at least one closure. The receptacle includes a vacuum device, a cavity for receiving an article of clothing, a container to surround the vacuum device and the cavity, and a door coupled to a side of the container. Activating the vacuum device seals the door. A first end of the chute is coupled to the receptacle and protrudes away from the receptacle. The at least one closure is detachably coupleable to a second end of each chute. The closure includes a sealing component detachably coupleable to the second end of the chute, and an activator mounted to the sealing component to activate the vacuum device in response to a pre-defined condition.

20 Claims, 9 Drawing Sheets

(56) References Cited

U.S. PATENT DOCUMENTS

| | | | |
|---|---|---|---|
| 4,849,999 A | | 7/1989 | Humphreys et al. |
| 5,083,704 A | | 1/1992 | Rounthwaite |
| 5,215,412 A | * | 6/1993 | Rogoff .................. B65G 51/34 406/112 |
| 5,562,367 A | * | 10/1996 | Scott ..................... B65G 51/34 406/112 |
| 6,619,525 B2 | | 9/2003 | Frankeburger et al. |
| 6,789,715 B2 | | 9/2004 | Frankeburger et al. |
| 7,318,459 B2 | | 1/2008 | Frankeburger et al. |
| 7,524,145 B2 | | 4/2009 | Heinz |
| 7,597,185 B1 | | 10/2009 | Fortenbery et al. |
| 7,886,402 B2 | | 2/2011 | Kihlstrom |
| 8,167,137 B2 | | 5/2012 | Osiensky et al. |
| 2003/0002927 A1 | | 1/2003 | Frankeburger et al. |
| 2006/0113159 A1 | | 6/2006 | Nyquist |
| 2008/0279640 A1 | | 11/2008 | Bryan et al. |
| 2009/0114666 A1 | | 5/2009 | Thorpe et al. |
| 2011/0002748 A1 | * | 1/2011 | Sundholm ............... B65F 5/005 406/46 |
| 2011/0058906 A1 | | 3/2011 | Moulsdale |
| 2011/0222972 A1 | | 9/2011 | Erceg et al. |
| 2012/0195697 A1 | | 8/2012 | Osiensky et al. |
| 2013/0195563 A1 | | 8/2013 | Sundholm |
| 2014/0219732 A1 | | 8/2014 | Thorpe |

\* cited by examiner

VACUUM LAUNDRY CHUTE SYSTEM

CROSS-REFERENCES TO RELATED APPLICATIONS

This application claims the benefit of U.S. Provisional Patent Application No. 62/257,047 filed on Nov. 18, 2015 for Drew P. Henry, which is incorporated herein by reference.

FIELD

This invention relates to laundry chutes and more specifically to vacuum laundry chute systems.

BACKGROUND

Doing laundry is routine chore in many households. Many factors can make doing laundry difficult. Laundry may be scattered about a house while the laundry facilities are located in one part of the house. In some cases, the laundry facilities of a house may be in an upper floor of the house and the laundry must be carried up to the facilities.

BRIEF SUMMARY

A vacuum laundry chute system is disclosed. The system includes a receptacle, at least one chute, and at least one closure. The receptacle includes a vacuum device, a cavity, a container, and a door. The cavity is for receiving one or more articles of clothing. The container surrounds the vacuum device and the cavity. The door is coupled to a side of the container. Activating the vacuum device seals the door closed. The at least one chute includes a first and second end. The first end is coupled to the receptacle and protrudes away from the receptacle. The at least one closure is detachably coupleable to the second end of each chute. The closure includes a sealing component and an activator. The sealing component is detachably coupleable to the second end of the chute. The activator is mounted to the sealing component. The activator activates the vacuum device in response to a pre-defined condition. The at least one indicator is mounted to the sealing component.

A laundry handling method is also disclosed. The method includes activating a vacuum device in response to a pre-defined condition. The method also includes applying a negative pressure to a chute system with the vacuum device. The method also includes receiving laundry at a closure structure of the chute system. The method also includes maintaining the negative pressure with the vacuum device to draw the laundry from the closure structure of the chute system to a cavity for receiving the laundry. The cavity includes a door sealable in response to the activation of the vacuum device. The method also includes receiving the laundry at the cavity. The method also includes releasing the door of the cavity, in response to a deactivation of the vacuum device, to vacate, from the cavity, the laundry received at the cavity.

A computer program product is also described. The computer program product includes a computer readable storage medium having program instructions embodied therewith. The program instructions are readable/executable by a processor to cause the processor to activate a vacuum device, in response to a predefined condition, to apply a negative pressure to a chute system. The program instructions also cause the processor to detect laundry introduced at a closure structure of the chute system with a modular wand activator mounted at the closure structure. The program instructions also cause the processor to maintain the negative pressure with the vacuum device to draw the laundry from the closure structure to a cavity for receiving the laundry. The cavity includes a door sealable in response to the activation of the vacuum device. The program instructions also cause the processor to detect receipt of the laundry at the cavity. The program instructions also cause the processor to deactivate the vacuum device in response to detection of the receipt of the laundry at the cavity.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Figure 1:
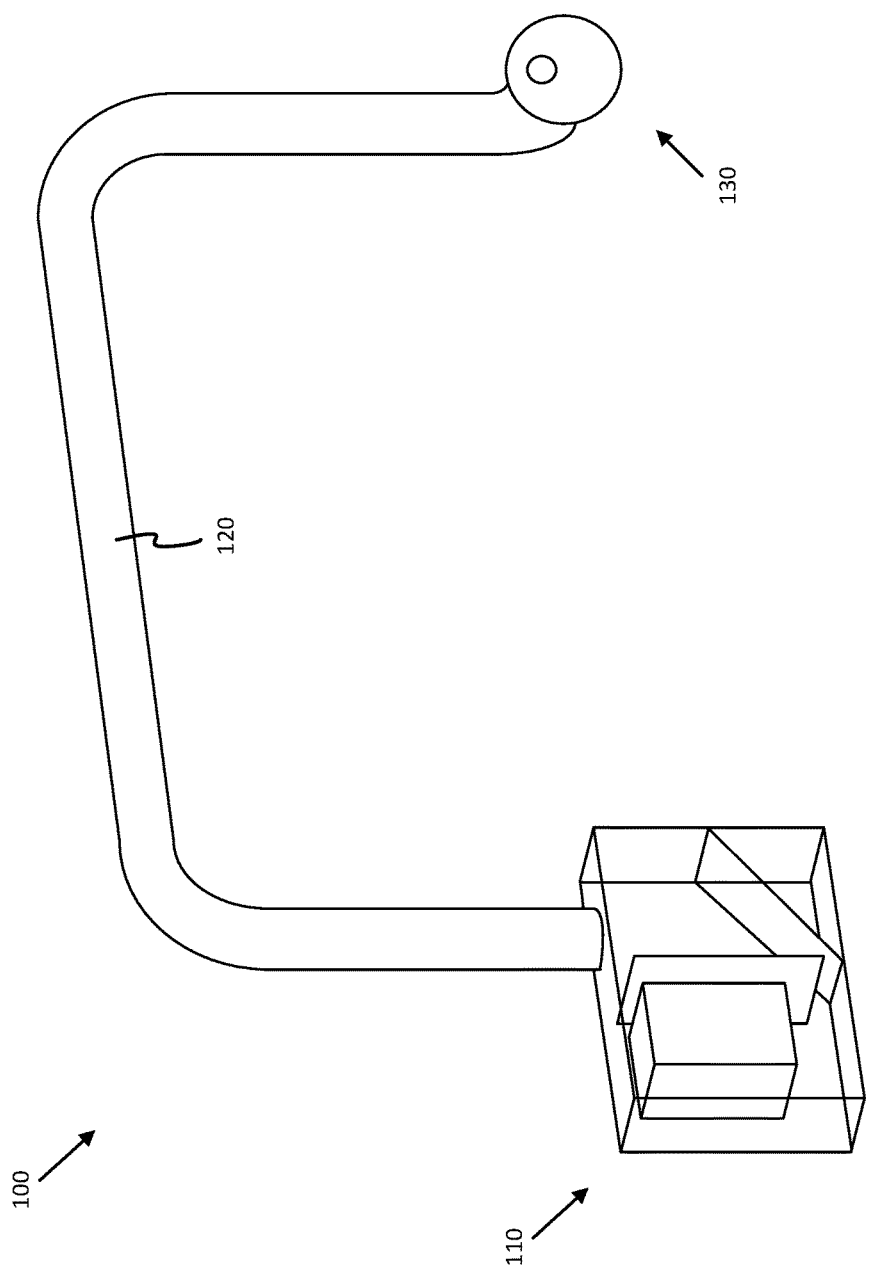
FIG. 1 is a perspective view illustrating one embodiment of a vacuum laundry chute system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of" or "one or more", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a vacuum laundry chute system 100. The system 100 may include a receptacle 110, at least one chute 120, and/or at least one closure 130. The system 100 may be built into a structure. In one embodiment, the structure may include a house. In one embodiment, the structure may include an apartment building, other multi-family dwelling, or the like. The receptacle 110 may be located in or near the laundry facilities of the structure. The chute 120 may be built into one or more walls of the structure. The closure 130 may be built into a room of the structure. For example, in one embodiment, a structure may include a closure 130 built into the wall of a bedroom. In one embodiment, the system 100 may be built into the structure during construction of the structure. In one embodiment, the system 100 may be retrofitted into the structure after construction of the structure.

In one embodiment, the system 100 may include at least one chute 120. In one embodiment, the chute 120 may include a length of material that includes a channel. The material surrounding the channel may include a thickness of any size. One or more cables, electrical lines, or the like may couple to the one or more chutes 120. For example, the one or more cables, electrical lines, or the like may run through the channel, through the material surrounding the channel, or the like. In one embodiment, the one or more cables, electrical lines, or the like may couple to the exterior of the chute 120 and run along the exterior of the chute 120. In one embodiment, the channel of the chute 120 may include a diameter of 6 inches (approx. 15.24 cm). In one embodiment, the diameter may be more than 6 inches. In one embodiment, the diameter may be fewer than 6 inches. In certain embodiments, the diameter may be small enough to prevent objects larger than articles of clothing from being inserted into the chute 120. In one embodiment, the chute 120 may be of any length. In some embodiments, an end of the chute 120 may include a diameter smaller than an intermediate diameter of the chute 120. In one embodiment, an end of the chute 120 may include a diameter larger than an intermediate diameter of the chute 120. In certain embodiments, the chute 120 may include one or more curves, bends, or the like. The curves, bends, or the like may include a curve, bend, or the like at any angle.

In one embodiment, a chute 120 may include a plurality of chute segments. The chute segments may couple together in a variety of ways. In one embodiment, the chute segments may glue together. A clamp may couple the chute segments together. In one embodiment, an end of a chute segment may include a flange. The flange of a first chute segment may couple to an end of a second chute segment. In a further embodiment, the flange of the first chute segment may couple to a flange of the end of the second chute segment. One of skill in the art will recognize other ways that a first chute segment may couple to a second chute segment.

In one embodiment, the system 100 may include a plurality of chutes 120. The plurality of chutes 120 may include a central chute and one or more secondary chutes. In one embodiment, a first end of each secondary chute 120 of the plurality of chutes 120 may couple to the central chute 120 and the second end of each secondary chute 120 may couple to a closure 130. In certain embodiments, one end of the central chute 120 may couple to the receptacle 110. In certain embodiments, a first secondary chute 120 may couple to a second secondary chute 120. The second secondary chute 120 may couple to the central chute 120. The system 100 may include a plurality of central chutes 120.

Figure 2:
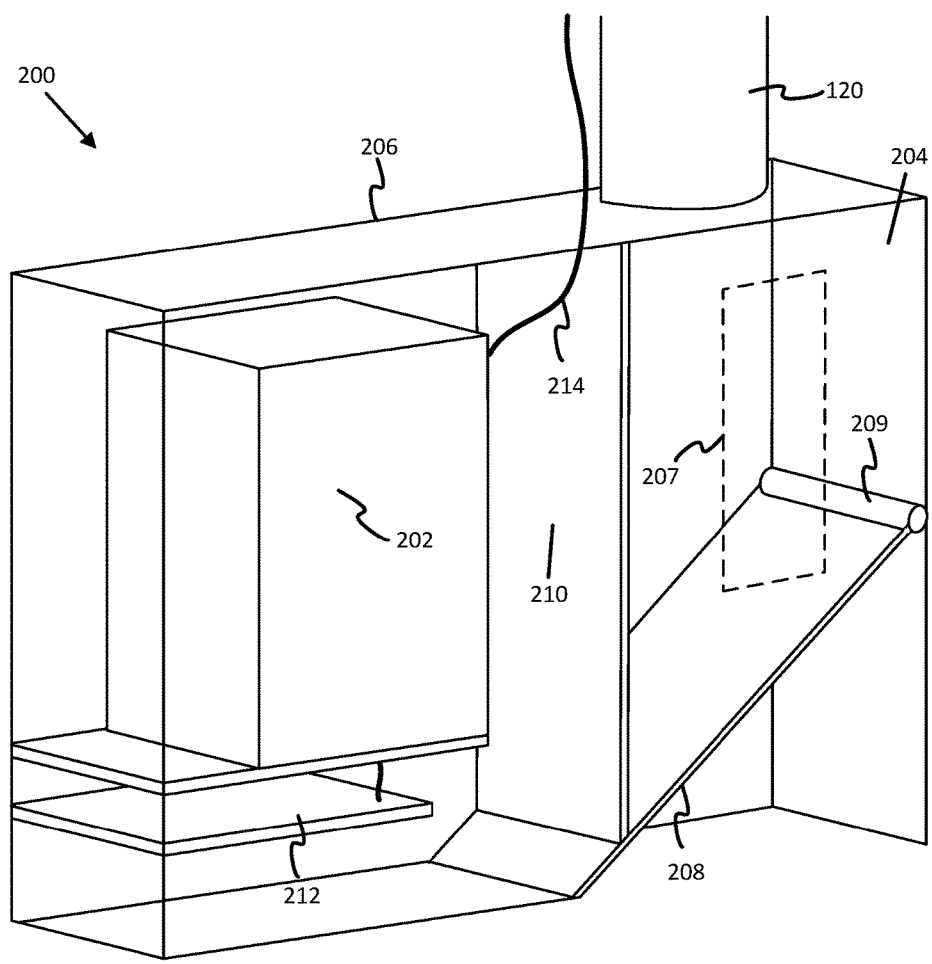
FIG. 2 is a perspective view illustrating one embodiment of a receptacle for a vacuum laundry chute system.

FIG. 2 depicts one embodiment of a receptacle 200 for a vacuum laundry chute system. In one embodiment, the receptacle 200 may include a vacuum device 202. In one embodiment, the receptacle 200 may include a clothing cavity 204. In one embodiment, the receptacle 200 may include a container 206. In one embodiment, the receptacle 200 may include a door 208. In one embodiment, the receptacle 200 may include a divider 210. In one embodiment, the receptacle 200 may include receptacle circuitry 212.

In one embodiment, the receptacle 200 may include a vacuum device 202. The vacuum device 202 may include any device capable of suctioning articles of clothing from the one or more closures, such as closure 130 of FIG. 1 to the receptacle 200. For example, in some embodiments, the vacuum device 202 may include an AIR FOXX Model AB1000a-1HP Utility Blower, a similar blower device, or the like. In some embodiments, the vacuum device 202 includes a negative pressure air handler and a positive pressure air handler which are separately operable to draw laundry towards the cavity 204 or create positive pressure to clear a blockage or move laundry away from the cavity 204. In one embodiment, the vacuum device 202 may receive power from a battery, the receptacle circuitry 212, a cable connected to a wall outlet, a cable connected to one or more closures 130, or the like (such as cable 214).

In one embodiment, the vacuum device 202 may blow air into the chute 120. The air flow into the chute 120 may push against a blockage in the chute 120. The air flow pushing against the blockage may dislodge the blockage. In response to the blockage being dislodged, the vacuum device 202 may reverse the air flow and suction one or more articles of clothing into the receptacle 200. In some embodiments, the blockage may include one or more articles of clothing. In one embodiment, the circuitry 212 (discussed below) may control the direction of air flow that the vacuum device 202 creates.

In one embodiment, the receptacle 200 may include a clothing cavity 204. The clothing cavity 204 may hold one or more articles of clothing. The clothing cavity 204 may include a cavity of any size and may hold any number of articles of clothing.

In one embodiment, the clothing cavity 204 may include a plurality of compartments. For example, in one embodiment, a first compartment may be a compartment for white clothing. In one embodiment, a second compartment may be a compartment for dark clothing. In one embodiment, a third compartment may be a compartment for delicate clothing. In certain embodiments, the plurality of compartments may include compartments for other categories of clothing. A user may change the configuration of one or more components of the receptacle 200 to change which compartment of the clothing cavity 204 receives the one or more articles of clothing. For example, a user may change the orientation, position, or the like of a component of the chute 120. A user may change the configuration of the one or more components of the receptacle 200 from a closure 130, as described below.

In one embodiment, the receptacle 200 may include a container 206. The container 206 may surround the vacuum device 202. In one embodiment, the container 206 may surround the clothing cavity 204. In one embodiment, the container 206 may surround one or more other components of the receptacle 200. The container 206 may include any material capable of holding one or more articles of clothing in the clothing cavity 204. In one embodiment, the container 206 may include any material capable of sealing the container 206 and allowing the vacuum device 202 to suction one or more articles of clothing from the one or more closures 130. In one embodiment, the container 206 may include one or more windows 207. The one or more windows 207 may be disposed on any location on the container 206. For example, a window 207 may be disposed near the clothing cavity 204 and may allow a user to see the amount of clothing inside the clothing cavity 204.

In one embodiment, the receptacle 200 may include a door 208. In one embodiment, the door 208 may couple to a side of the container 206. In a further embodiment, the door 208 may include a hinge 209 and rotatably couple to a side of the container 206. The door 208 may hang substantially downward from the receptacle 200.

In one embodiment, the door 208 may press against the container 206 in response to the vacuum device 202 being activated. The door 208 pressing against the container 206 may seal the door 208 against the container 206. The door 208 may press against the container 206 at an angle to one or more sides of the container 206. For example, as depicted in FIG. 2, in one embodiment, the door 208 may be disposed at a 45 degree angle from a side of the container 206. In one embodiment, the door 208 may be disposed at less than a 45 degree angle. In certain embodiment, the door 208 may be disposed at greater than a 45 degree angle. In one embodiment, in response to the vacuum device 202 being deactivated, the door 208 may unseal from against the container 206. For example, in one embodiment, the vacuum device 202 may change the air pressure in the receptacle 200. In response to the change in air pressure, the door 208 may press against the container 206 and may seal the door 208 against the container 206. In response to the vacuum device 202 being deactivated, the air pressure may return to its condition previous to the activation of the vacuum device 202 and the door 208 may unseal from against the container 206. In response to the door 208 unsealing from against the container 206, the door may swing open. The open door 208 may release one or more articles of clothing from the receptacle 200.

In one embodiment, the receptacle 200 may include a divider 210. The divider 210 may prevent one or more articles of clothing from coming into contact with the vacuum device 202 or one or more other components of the receptacle 200. The divider 210 may retain one or more articles of clothing in the clothing cavity 204.

In one embodiment, the divider 210 may allow the vacuum device 202 to suction air from inside the receptacle 200 and the one or more chutes 120 while preventing one or more articles of clothing from contacting the vacuum device 202. For example, the divider 210 may include a piece of material with one or more apertures. The one or more apertures may be of any size to allow suction and prevent clothing from passing through. In one embodiment, the divider 210 may include a grate.

In one embodiment, the receptacle 200 may include receptacle circuitry 212. In one embodiment, the receptacle circuitry 212 may include any hardware that may carry out various functions of the vacuum laundry chute system. For example, in one embodiment, the receptacle circuitry 212 may include hardware modules, hardware circuits, hardware chips, programmable hardware devices, programmable array logic, programmable logic devices or the like as described above. In one embodiment, the receptacle circuitry 212 may include any software, such as software modules or the like as described above, that may carry out various functions of the vacuum laundry chute system. In one embodiment, the receptacle circuitry 212 may receive power, electricity, or the like to power one or more components of the receptacle 200. The receptacle circuitry 212 may receive power from a battery, a wall outlet, one or more closures 130, or any other power source. In one embodiment, the receptacle circuitry 212 may control the activation and/or deactivation of the vacuum device 202. In one embodiment, the receptacle circuitry 212 may receive one or more signals from the one or more closures 130 via one or more cables, such as the cable 214.

In certain embodiments, the receptacle circuitry 212 may activate the vacuum device 202 in response to receiving one or more signals from one or more closures 130. The circuitry 212 may control whether the vacuum device 202 suctions one or more articles of clothing into the receptacle 200 or whether the vacuum device 202 blows air into the chute 120. The one or more signals may indicate to the circuitry 212 whether to activate the vacuum device 202 to suction one or more articles of clothing into the receptacle 200 or whether to blow air into the chute 120. In one embodiment, the receptacle circuitry 212 may deactivate the vacuum device 202 in response to receiving one or more signals from one or more closures 130. In one embodiment, the receptacle circuitry 212 may include a timer. In a further embodiment, the receptacle circuitry 212 may deactivate the vacuum device 202 in response to the timer expiring. In one embodiment, the receptacle circuitry 212 may send one or more signals to one or more closures 130 in response to the activation and/or deactivation of the vacuum device 202.

In one embodiment, the receptacle circuitry 212 may connect to the vacuum device 202. The receptacle circuitry 212 may connect to the vacuum device 202 via one or more cables coupled between the vacuum device 202 and the receptacle circuitry 212. In one embodiment, the receptacle circuitry 212 activating and/or deactivating the vacuum device 202 may include the receptacle circuitry 212 sending one or more signals via the one or more cables to the vacuum device 202. In one embodiment, the receptacle circuitry 212 activating the vacuum device 202 may include causing a power source to supply power to the vacuum device 202. In one embodiment, the receptacle circuitry 212 deactivating the vacuum device 202 may include causing a power source to not supply power to the vacuum device 202.

In one embodiment, the receptacle circuitry 212 may include one or more sensors disposed at various locations inside and/or around the receptacle 200. In a further embodiment, the receptacle circuitry 212 may include one or more sensors disposed inside the clothing cavity 204. The one or more sensors may send a signal to one more components of the receptacle circuitry 212 in response to the clothing cavity 204 being full of articles of clothing. In one embodiment, the one or more sensors may be disposed on or around the door 208. The one or more sensors may send a signal to one or more components of the receptacle circuitry 212 in response to the door 208 being open, the door 208 being closed, the door 208 being sealed, or the like. In one embodiment, one or more sensors may determine the color of an article of clothing. In response to the one or more sensors determining the color of an article of clothing, the receptacle circuitry 212 may send one or more signals to one or more components of the receptacle 200 and change which compartment of the clothing cavity 204 the article of clothing is received into.

In one embodiment, the vacuum device 202 may expel air suctioned from inside the receptacle 200 outside the receptacle 200. The vacuum device 202 may expel the air in a variety of ways. For example, in one embodiment, the vacuum device 202 may expel the air through a tube. A first end of the tube may be disposed inside the receptacle 200. In a further embodiment, the first end of the tube may couple to the exhaust of the vacuum device 202 or may couple to the receptacle 200 near to the exhaust of the vacuum device 202. The tube may protrude through the receptacle 200 and the second end of the tube may be disposed outside the receptacle 200.

In one embodiment, the air expelled from the receptacle may be rerouted to another part of the vacuum laundry chute system 100. For example, in one embodiment, a flexible tube may couple to the receptacle 200 or to the exhaust of the vacuum device 202. The flexible tube may be of any length. A first end of the flexible tube may receive the air expelled from the receptacle 200. A user may connect the second end of the flexible tube to a closure 130. The expelled air may travel through the flexible tube, into the closure 130, and into one or more chutes 120. The expelled air may push a blockage in a chute 120 and dislodge the blockage.

Figure 3A:
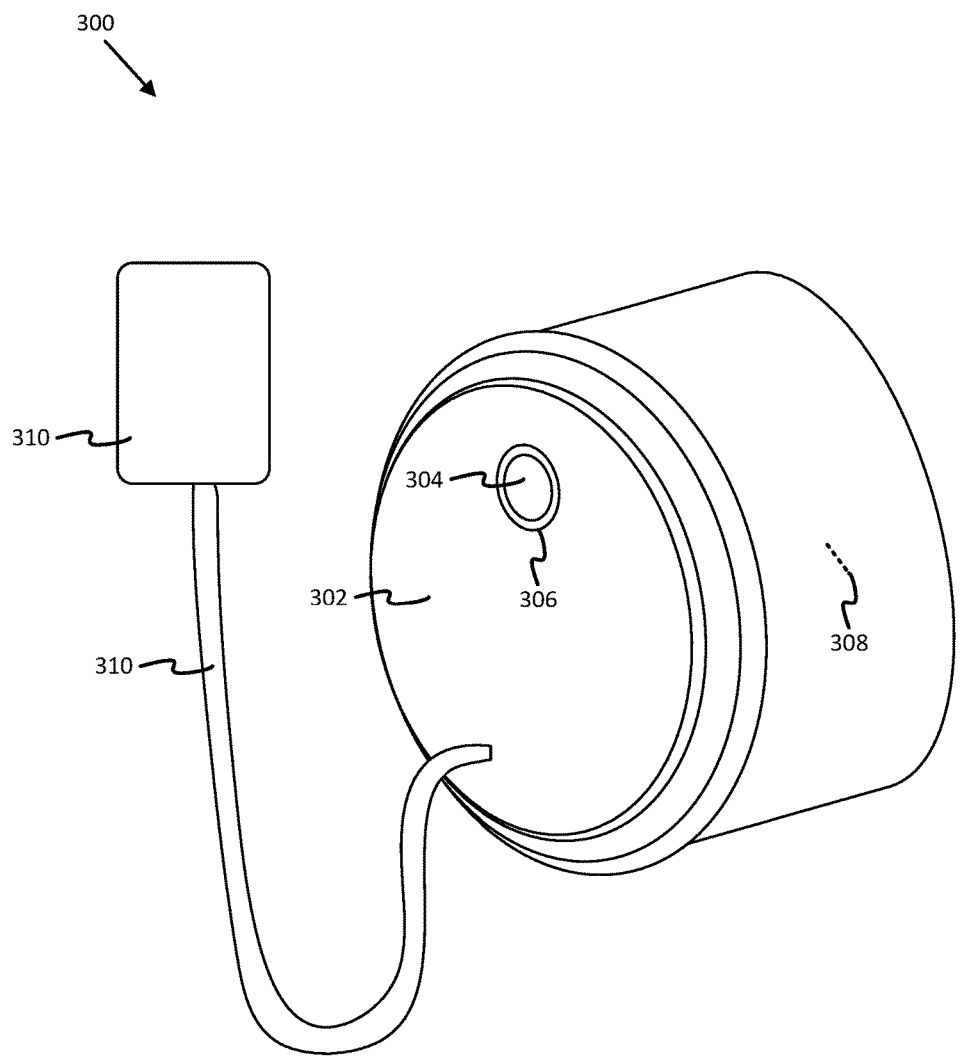
FIG. 3A is a perspective view illustrating one embodiment of a closure for a vacuum laundry chute system.

FIG. 3A depicts one embodiment of a closure 300 for a vacuum laundry chute system. In one embodiment, the closure 300 may include a sealing component 302. In one embodiment, the closure 300 may include an activator 304. In one embodiment, the closure 300 may include one or more indicators 306. In one embodiment, the closure 300 may include closure circuitry 308. In one embodiment, the closure 300 may include a cable housing 310.

In one embodiment, the closure 300 may include a sealing component 302. The sealing component 302 may include one or more pieces of material capable of covering an end of the one or more chutes 120. The sealing component 302 may engage with an end of a chute 120. In one embodiment, the sealing component 302 may include one or more flexible materials disposed on the sealing component 302 and shaped to engage with an end of a chute 120. In one embodiment, the vacuum device 202 may suction one or more articles of clothing into and/or through the chute 120 while the sealing component 302 is disengaged from and/or decoupled from the end of the chute 120. In one embodiment, the vacuum device 202 may suction one or more articles of clothing into and/or through the chute 120 while the sealing component is engaged with and/or coupled to the end of the chute 120.

In one embodiment, the closure 300 may include an activator 304. The activator 304 may send one or more signals to the receptacle circuitry 212. In one embodiment, the activator 304 may send one or more signals to the closure circuitry 308 and, in response to receiving one or more signals from the activator 304, the closure circuitry 308 may send one or more signals to the receptacle circuitry 212. The activator 304 may send the one or more signals in response to a user interacting with the activator 304.

In one embodiment, the activator 304 may include one or more buttons. A user pressing a button may send one or more signals to the closure circuitry 308 and/or the receptacle circuitry 212. In one embodiment, the one or more buttons may be pressed in pre-determined sequences to send different signals. For example, in one embodiment, pressing a button once may include activating the vacuum device 202 for 10 seconds. In one embodiment, pressing the button twice may include activating the vacuum device 202 for 20 seconds. In one embodiment, pressing the button three times may include turning off one or more lights of the closure 300. The preceding pre-determined sequences are given as example and are not limiting. The pre-determined sequence may include any sequence and may send a variety of signals.

In certain embodiments, the activator 304 may include any component that a user may interact with to send one or more signals to the closure circuitry 308 and/or the receptacle circuitry 212. For example, an activator 304 may include, without limitation, a button, a touchscreen, a knob, a scroll wheel, or any other component that a user may interact with. One of skill in the art will recognize other forms that the activator 304 may include.

In one embodiment, the closure 300 may include one or more indicators 306. The one or more indicators 306 may indicate a status of one or more components of the vacuum laundry chute system. In one embodiment, the one or more indicators 306 may include one or more lights. In one embodiment, the one or more indicators 306 may include screens. The one or more screens may display text, images, or the like. In one embodiment, the one or more indicators 306 may include one or more speakers. The one or more speakers may reproduce audio. In one embodiment, the one or more indicators 306 may include different types of indicators 306. One of skill in the art will recognize other forms the one or more indicators 306 may include.

In one embodiment, the one or more indicators 306 may receive one or more signals from one or more components of the vacuum laundry chute system. For example, in one embodiment, the one or more indicators 306 may receive one or more signals from the closure circuitry 308. In one embodiment, the one or more indicators 306 may receive one or more signals from the receptacle circuitry 212. In one embodiment, the one or more indicators 306 may receive one or more signals from one or more components of a second closure 300.

In one embodiment, the one or more indicators 306 may indicate a status of one or more components of the vacuum laundry chute system. In one embodiment, the one or more indicators 306 may receive a signal that the vacuum device 202 is activated. For example, a user may activate the vacuum device 202 by interacting with an activator 304 of a first closure 300 and a second closure 300 may receive a signal that the vacuum device 202 is activated. In response to the one or more indicators 306 receiving a signal that the vacuum device 202 is activated, the indicator 306 may indicate that the vacuum device 202 is activated. For example, in one embodiment, an indicator 306 may include a light and in response to receiving a signal that the vacuum device 202 is activated, the light may light up, change color, flash, or the like to indicate to a user that the vacuum device 202 is activated.

In one embodiment, the one or more indicators 306 may receive a signal from a component of the vacuum laundry chute system. For example, in one embodiment, in response to a sensor sensing that one or more chutes 120 are blocked, the one or more indicators 306 may receive a signal and indicate that one or more chutes 120 are blocked. In one embodiment, in response to a sensor sensing that the clothing cavity 204 is full and/or that one or more compartments of the clothing cavity 204 are full, the one or more indicators 306 may receive a signal and indicate that the clothing cavity 204 is full and/or that one or more compartments of the clothing cavity 204 are full. In certain embodiments, the indications may be different and/or unique from one another.

In one embodiment, the closure 300 may include closure circuitry 308. In one embodiment, the closure circuitry 308 may include hardware such as hardware described above in relation to the receptacle circuitry 212. In one embodiment, the closure circuitry 308 may include software such as software describe above in relation to the receptacle circuitry 212. In one embodiment, the closure 300 may include a covering disposed around the closure circuitry 308. The closure circuitry 308 may receive one or more signals from the one or more activators 304 of the closure 300. In response to receiving one or more signals from the one or more activators 304, the closure circuitry 308 may send one or more signals to the receptacle circuitry 212, to the vacuum device 202, or to any other component of the vacuum laundry chute system. In one embodiment, the closure circuitry 308 may receive one or more signals from the receptacle circuitry 212, or any other component of the vacuum laundry chute system. In response to receiving one or more signals, the closure circuitry 308 may send one or more signals to the one or more indicators 306. In one embodiment, the closure circuitry 308 may process, transform, or the like one or more signals received from the one or more activators 304 and/or received from one or more components of the vacuum laundry chute system.

In one embodiment, the closure 300 may include a cable housing 310. In one embodiment, the cable housing 310 may include one or more cables, electrical lines, or the like. In one embodiment, one or more cables may supply power to one or more components of the vacuum laundry chute system. In one embodiment, one or more cables may connect to a plug. In a further embodiment, the plug may plug into an outlet and receive power from the outlet. In one embodiment, one or more cables connect to a battery or other power source. The one or more cables of the cable housing 310 may supply power to one or more components of the closure 300. For example, the cable housing 310 may supply power to the closure circuitry 308, the one or more activators 304, the one or more indicators 306, or any other component of the closure 300.

In one embodiment, the cable housing 310 may include one or more cables that may supply power to one or more components of the receptacle 200. In one embodiment, the cable housing 310 may include the cable 214 of the receptacle 200. In one embodiment, the one or more cables may supply power to the vacuum device 202, the receptacle circuitry 212, one or more components of the receptacle 200 that may change which compartment of the clothing cavity 204 receives one or more articles of clothing, or any other component of the receptacle 200. In one embodiment, the closure 300 may include a battery. The battery may supply power to one or more components of the closure 300.

In one embodiment, the cable housing 310 may include one or more cables that connect the closure circuitry 308 with the receptacle circuitry 212. The one or more cables may propagate signals from the closure 300 to the receptacle circuitry 212. For example, as described above, an activator 304 may send a signal via the one or more cables of the cable housing 310 to the receptacle circuitry 212 and, in response to receiving the signal from the activator 304, the receptacle circuitry 212 may activate the vacuum device 202.

In one embodiment, the one or more cables may propagate signals from the receptacle circuitry 212 to the closure 300. For example, as described above, the receptacle circuitry 212 may send a signal via the one or more cables of the cable housing 310 to the closure circuitry 308. In response to receiving the signal from the receptacle circuitry 212, the closure circuitry 308 may send a signal to an indicator 306 to indicate that the vacuum device 202 is activated.

In one embodiment, the closure 300 may include one or more sensors. The one or more sensors may sense when the sealing component 302 is removed from the end of the chute 120. In response to one or more sensors sensing the sealing component 302 being removed from the end of the chute 120, the closure circuitry 308 may send one or more signals to one or more components of the vacuum laundry chute system. For example, the closure circuitry 308 may send one or more signals to one or more components of the receptacle 200 and activate the vacuum device 202. In one embodiment, in response to one or more sensors sensing the sealing component 302 being inserted into the end of the chute 120, the closure circuitry 308 may send one or more signals to one or more components of the vacuum laundry chute system. For example, the closure circuitry 308 may send one or more signals to one or more components of the receptacle 200 and deactivate the vacuum device 202.

Figure 3B:
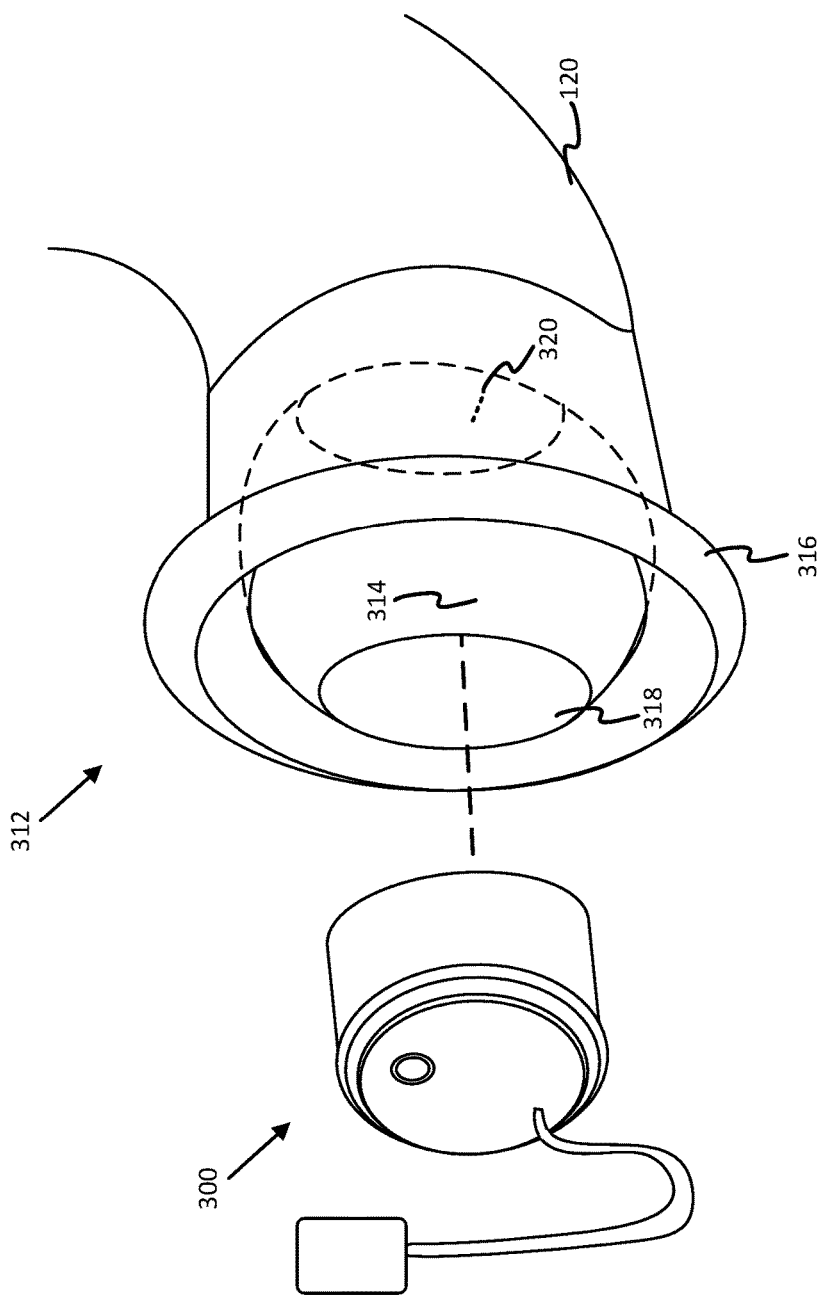
FIG. 3B is a perspective view illustrating a further embodiment of a closure and a jet diffuser for vacuum laundry chute system.

FIG. 3B depicts one embodiment of a closure 300 and a jet diffuser 312. In one embodiment, the jet diffuser 312 may couple to an end of the chute 120. In one embodiment, the jet diffuser 312 may include a sphere 314. In one embodiment, the jet diffuser 312 may include a channel 316. The sphere 314 may be disposed inside the channel 316. The sphere 314 may include a first aperture 318. The first aperture 318 may be disposed on the sphere 314 facing away from the end of the chute 120. In one embodiment, the sphere 314 may include a second aperture 320. The second aperture 320 may be disposed on the sphere 314 facing toward the end of the chute 120 and on the side of the sphere 314 substantially opposite of the first aperture 318. In one embodiment, the closure 300 may insert into the first aperture 318 of the sphere 314, for example, as shown in FIG. 3B.

In one embodiment, the sphere 314 may swivel inside the channel 316. For example, a child user may swivel the sphere 314 downward. In response to the user swiveling the sphere 314 downward, the first aperture 318 may be disposed on the sphere 314 at a downward angle. The downward angle of the first aperture 318 may allow the child user to more easily insert one or more articles of clothing into the first aperture 318. In one embodiment, for example, a user may swivel the sphere 314 upward. In response to the user swiveling the sphere 314 upward, the first aperture 318 may be disposed on the sphere 314 at an upward angle. The upward angle of the first aperture 318 may allow an adult user to more easily insert one or more articles of clothing into the first aperture 318. In one embodiment, a user may swivel the sphere 314 to a side.

Figure 4:
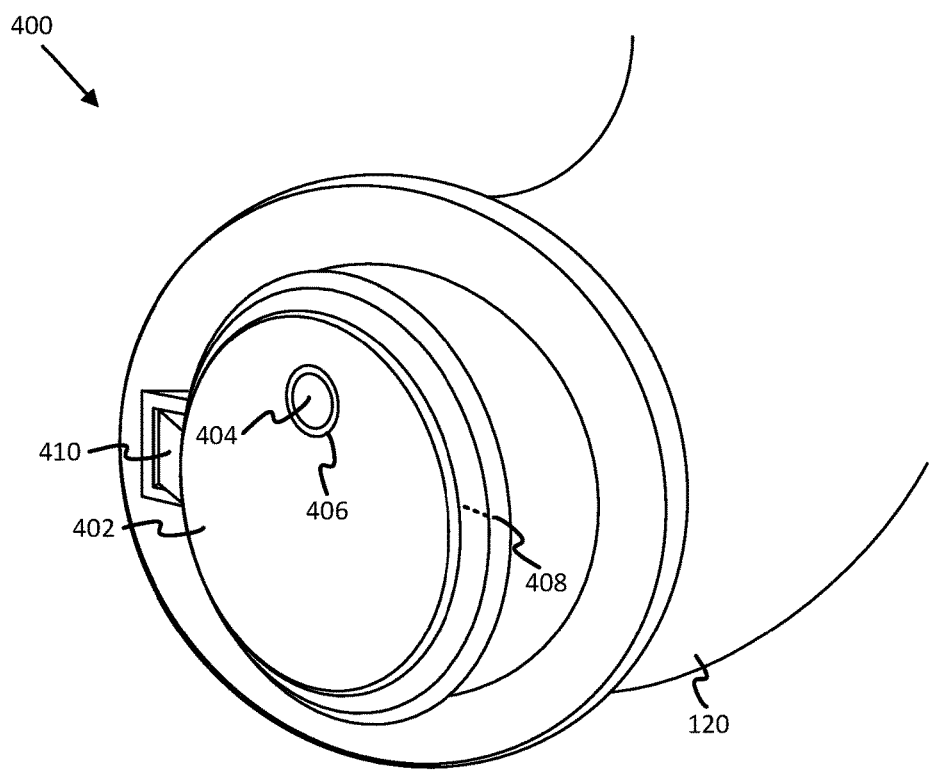
FIG. 4 is a perspective view illustrating a further embodiment of a closure for vacuum laundry chute system.

FIG. 4 depicts a further embodiment of a closure 400 for a vacuum laundry chute system. In one embodiment, the closure 400 may include a sealing component 402. In one embodiment, the closure 400 may include one or more activators 404. In one embodiment, the closure 400 may include one or more indicators 406. In one embodiment, the closure 400 may include closure circuitry 408. In one embodiment, the closure 400 may include a hinge 410.

In one embodiment, the sealing component 402 may include a sealing component substantially similar to the sealing component 302 of the closure 300. In one embodiment, the one or more activators 404 may include one or more activators substantially similar to the activators 304 of the closure 300. In one embodiment, the one or more indicators 406 may include one or more indicators substantially similar to the one or more indicators 306 of the closure 300. In one embodiment, the closure circuitry 408 may include circuitry substantially similar to the closure circuitry 308 of the closure 300.

In one embodiment, the closure 400 may include a hinge 410. In one embodiment, the hinge 410 may rotatably couple the sealing component 402 to an end of a chute 120. In certain embodiments, the hinge 410 may be disposed on a side of the sealing component 402, above the sealing component 402, below the sealing component 402, or the like. In one embodiment, the hinge 410 may include one or more cables. The one or more cables may connect one or more components of the closure 400 to one or more other components of the vacuum laundry chute system. The one or more cables may supply power to one or more components of the closure 400. The one or more cables may send one or more signals to the one or more components of the closure 400. The one or more cables may send one or more signals from the one or more components of the closure 400 to one or more other components of the vacuum laundry chute system. The one or more signals received from and/or sent to the one or more components of the closure 400 may include the one or more signals as described above in relation to the closure 300 (for example, in certain embodiments, sending one or more signals to the vacuum device 202 to activate or deactivate the vacuum device 202).

In one embodiment, in response to a timer expiring, the sealing component 402 may close. In a further embodiment, one or more components of the hinge 410 may rotatably move the sealing component 402 and close the end of the chute 120. In one embodiment, the timer may include a timer of the receptacle circuitry 212. In a further embodiment, the receptacle circuitry 212 may send one or more signals to one or more components of the hinge 410. In one embodiment, the timer may include a timer of the closure circuitry 408. In a further embodiment, the closure circuitry 408 may send one or more signals to one or more components of the hinge 410.

In one embodiment, the hinge 410 may include one or more sensors. The one or more sensors may send one or more signals to the receptacle 200 in response to the hinge 410 moving into a pre-determined position. For example, in one embodiment, in response to the closure 400 being opened, the hinge 410 may move into a certain position. The one or more sensors may detect the hinge 410 moving into the position and send a one or more signals to the receptacle circuitry 212. In response to the receptacle circuitry 212 receiving the one or more signals from the one or more sensors of the hinge 410, the receptacle circuitry 212 may activate the vacuum device 202. In one embodiment, in response to the one or more sensors sensing that the closure 400 closing, the sensors may send one or more signals to the receptacle circuitry 212. In response to receiving the one or more signals, the receptacle circuitry 212 may deactivate the vacuum device 202.

In one embodiment, the closure 400 may mount to a jet diffuser 312. In one embodiment, the jet diffuser 312 may mount to an end of the chute 120. The jet diffuser 312 may include a jet diffuser substantially similar to the jet diffuser 312 of FIG. 3B.

In one embodiment, one or more components of the closure 400 may receive power. In one embodiment, the one or more components may include an activator 404, an indicator 406, the closure circuitry 408, or any other component of the closure 400. In one embodiment, the hinge 410 may include one or more cables that supply power to one or more components of the closure 400. In one embodiment, the one or more components of the closure 400 may include a battery. In a further embodiment, the battery may supply power to the one or more components of the closure 400.

Figure 5:
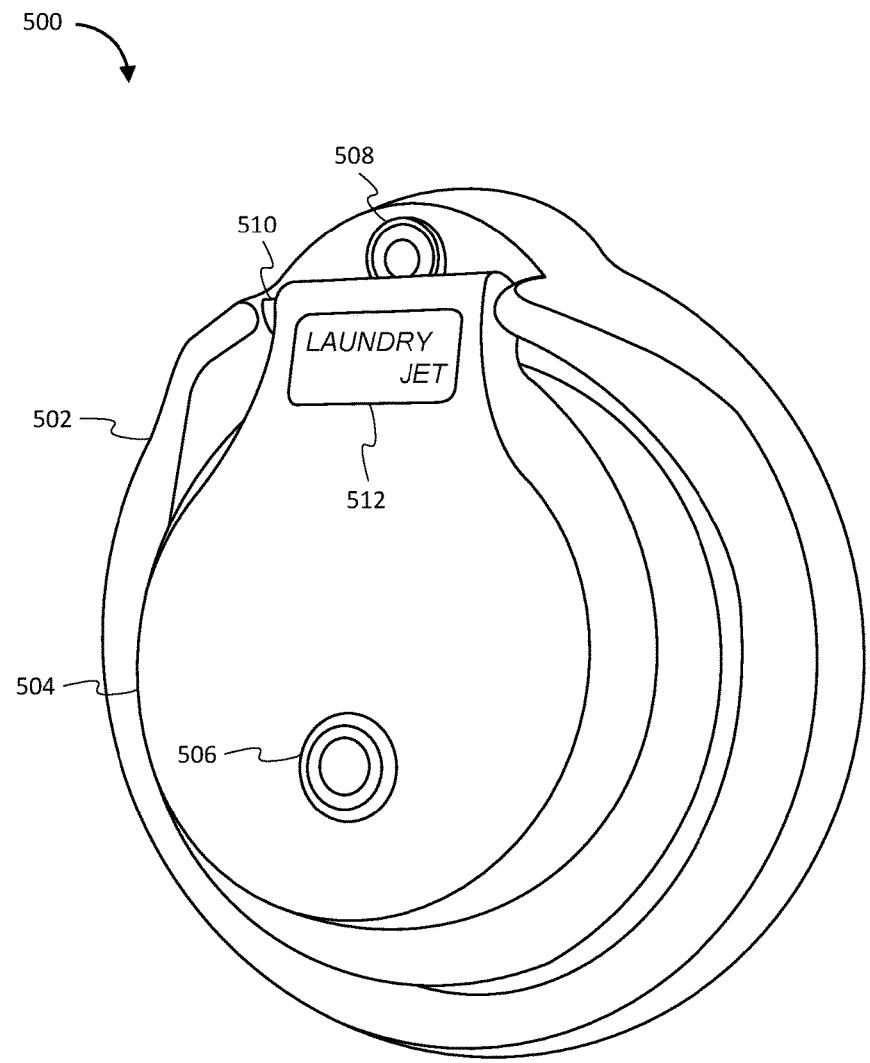
FIG. 5 is a perspective view illustrated another embodiment of a closure for a vacuum laundry system.

FIG. 5 is a perspective view illustrating another embodiment of a closure 500 for a vacuum laundry chute system. The closure 500 includes a channel cap 502, a sealing component 504, an indicator 506, an activator 508, and a hinge 510. The channel cap 502 interfaces with a chute system such as the system 100 of FIG. 1. In the illustrated embodiment, the channel cap 502 is sealed by the sealing component 504. The sealing component 504 includes the indicator 506. In some embodiments, the indicator 506 displays a status of a component of the system. The indicator 506 may display the status of one of more components of the system through display of a luminance level, a color, a patter, a sound, or other visual, audio, or tactile indication.

In the illustrated embodiment, the closure 500 includes the activator 508. In some embodiments, the activator 508 is coupled to the indicator 506 to supply the status to the indicator 506. The activator 508 is described in further detail below with relation to FIGS. 6 and 7. In some embodiments, the sealing component 504 is coupled to the channel cap 502 via the hinge 510. The hinge 510 may include sensors to detect an open/closed state of the sealing component 504 relative to the channel cap 502. Other functionality may be incorporated into the hinge 510 such as sensors for detecting other variables, holding the sealing component 504 open, locking the sealing component 504 closed to prevent tampering or maintain suction to another location of the system.

In the illustrated embodiment, the sealing component 504 of the closure 500 includes a logo region 512. In some embodiments, the logo region 512 provides an area to apply a logo in the form of a plate, sticker, or other substrate. In other embodiments, the logo region 512 provides an area where a logo may be stamped, machined, molded, or otherwise formed in the material of the sealing component 504. The logo may include a product logo, operation instructions, warnings, or other information. In some embodiments, the logo region 512 may be combined with the indicator 506 to for a unified structure on the sealing component 504. In some embodiments, the logo region 512 and/or the indicator 506 may be included on a display such as an electronic display capable of display text or images to communicate the logo, instructions, warnings, statuses, or other information to a user, installer, or service technician.

Figure 6:
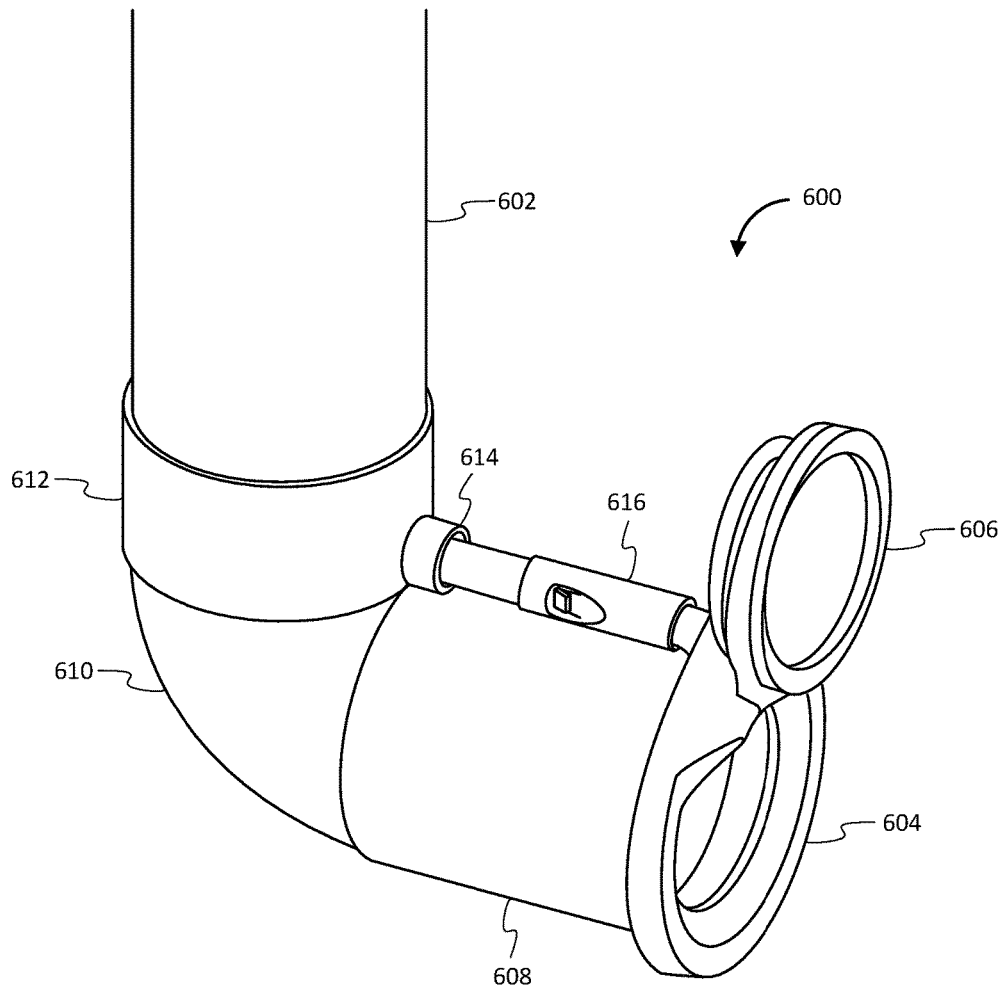
FIG. 6 is a perspective view illustrating one embodiment of a closure installed on a chute.

FIG. 6 is a perspective view illustrating one embodiment of a closure 600 installed on a chute 602. In the illustrated embodiment, the closure 600 includes a channel cap 604 and a sealing component 606. In the illustrated view, the sealing component 606 is open allowing air to be drawn through the channel cap 604 and into a first portion of the chute 602. In the illustrated embodiment, the first portion of the chute 602 is a cap collar 608. In some embodiments, the cap collar 608 is coupled to the channel cap 604. The cap collar 608 may be coupled to the channel cap 604 by friction locks, threads, or other retaining elements or structures. In another embodiment, the cap collar 608 is unified portion of the channel cap 604.

In the illustrated embodiment, the cap collar 608 connects to an elbow 610 of the chute 602. In some embodiments, the cap collar 608 is bonded or otherwise attached to the elbow 610. The elbow 610 may be a 90-degree bend or a straight or non-90-degree bend in the chute 602. In some embodiments, the cap collar 608 includes the elbow 610 as a unified portion of the cap collar 608. In the illustrated embodiment, the elbow is connected to a connection collar 612. In some embodiments, the connection collar 612 facilitates connection of the elbow 610 to the rest of the chute 602. In the illustrated embodiment, the connection collar 612 also includes a connection port 614.

In some embodiments, the connection portion 614 receives the activator 616. The connection port 614 may include a physical coupling to secure the activator 616. The connection port 614 may also include electrical connections to connect the activator 616 to a central processor or other component of the system.

In some embodiments, the activator 616 is a modular wand or package which includes one or more sensors, electrical connections, processors, batteries, storage devices, antennas, or other electronic devices. In some embodiments, the activator 616 is modular and can be removed from the system through a front surface of the channel cap 604. The activator 616 is described in greater detail below with reference to FIG. 7.

Figure 7:
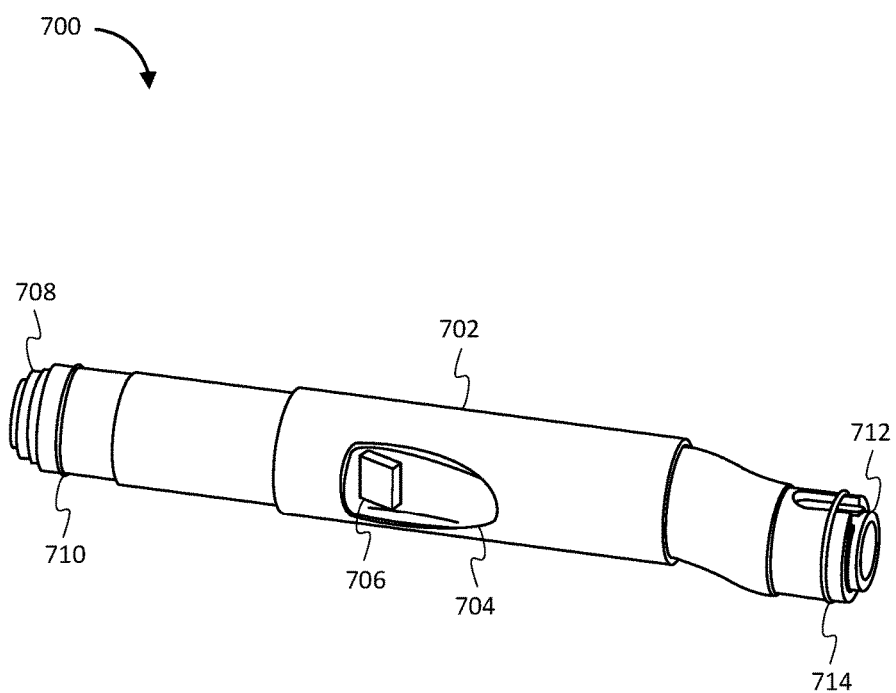
FIG. 7 is a perspective view illustrating one embodiment of an activator.

FIG. 7 is a perspective view illustrating one embodiment of an activator 700. The illustrated embodiment includes a housing 702, a connection feature 704, a connection interface 706, a distal end 708 with a distal end gasket 710, and a proximal end 712 with a proximal end gasket 714. In some embodiments, the connection feature 704 is formed in the housing 702 to accommodate attachment of at least one of a sensor, power cable, signal line, or other connection at the connection interface 706. In one embodiment, the connection port 706 is part of a sensor built into the activator 700.

The distal end 708 of the activator 700 is inserted into the connection port 614 of FIG. 6. In the illustrated embodiment, the distal end 708 includes the distal end gasket 710. The distal end gasket 710 provides a sealed interface at the distal end 708 when the activator 700 is installed. In some embodiments, the distal end gasket 710 is a separate rubber or plastic O-ring. In other embodiments, the distal end gasket 710 is a raised portion of the housing 702.

In some embodiments, the distal end 708 of the activator 700 includes electrical power or signal connections to connect to power or signal interfaces in the connection port 614 of FIG. 6. Similarly, the proximal end 712 of the activator 700 includes a proximal end gasket 714 and may include power or signal connections, lights, or other display or illumination components. The proximal end 712 of the activator 700 can be seen protruding through the front of the channel cap 502 as activator 508 in FIG. 5.

In the illustrated embodiment, the housing 702 has a jog near the proximal end 712. In this embodiment, the activator 700 is formed to facilitate removal and replacement of the activator 700 from the channel cap without needing to remove the channel cap from the wall or other mounting surface or structure.

Figure 8:
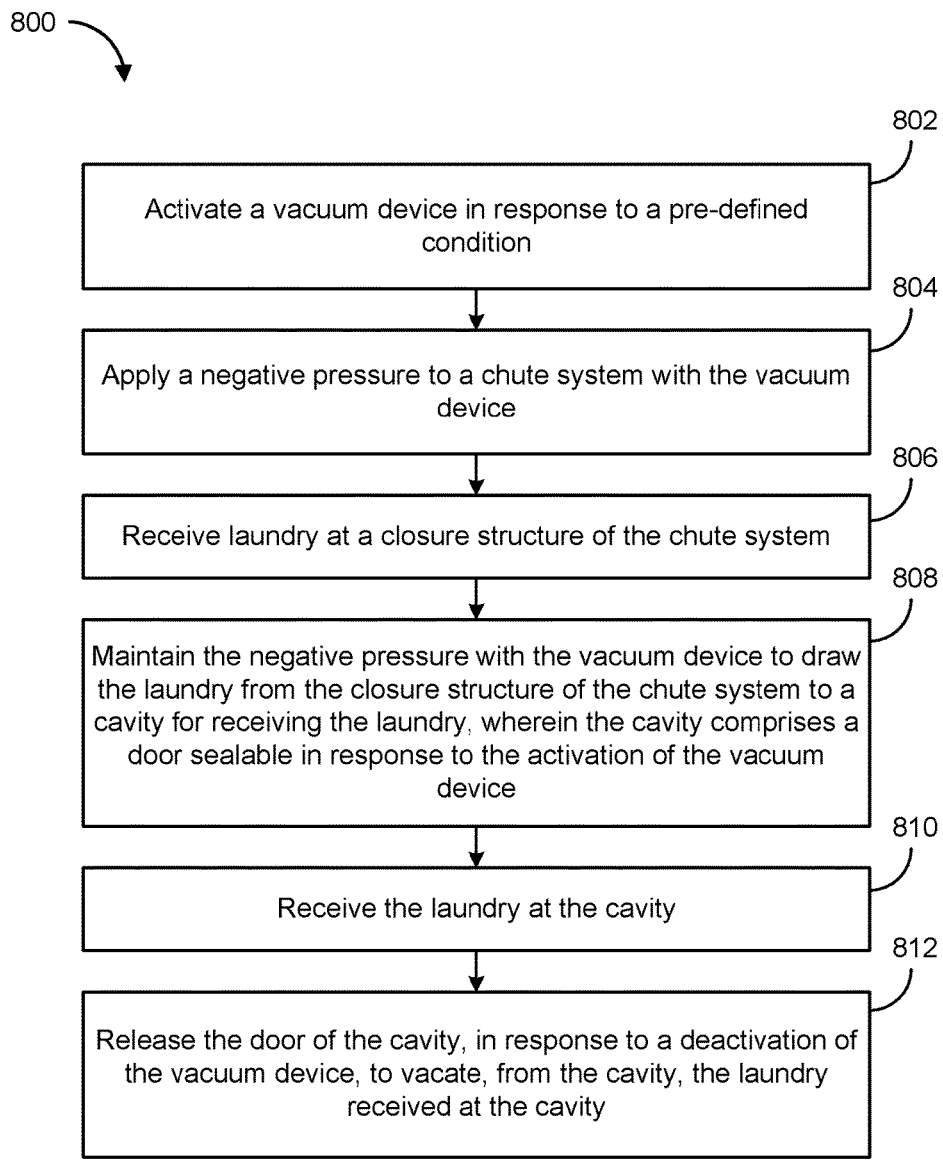
FIG. 8 is a flow chart diagram illustrating one embodiment of a method of laundry handling.

FIG. 8 is a flow chart diagram illustrating one embodiment of a method 800 of laundry handling. At block 802 a vacuum device is activated in response to a pre-defined condition. In some embodiments, the pre-defined condition includes an input at a closure structure, detection of laundry at a closure structure, detection of a blockage in a chute, or other scheduled or detected variable.

At block 804, a negative pressure is applied to a chute system with the vacuum device. At block 806, laundry is received at a closure structure of the chute system. At block 808, the negative pressure is maintained with the vacuum device to draw the laundry from the closure structure of the chute system to a cavity for receiving the laundry. The cavity includes a door sealable in response to the activation of the vacuum device.

At block 810, the laundry is received at the cavity. At block 812, the door of the cavity is released, in response to a deactivation of the vacuum device, to vacate, from the cavity, the laundry received at the cavity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vacuum laundry chute system comprising:
   a receptacle comprising:
      a vacuum device,
      a cavity for receiving one or more articles of clothing;
      a container surrounding the vacuum device and the cavity; and
      a door coupled to a side of the container, wherein activating the vacuum device seals the door closed;
   at least one chute comprising a first end and a second end, the first end coupled to the receptacle and protruding away from the receptacle; and
   at least one closure detachably coupleable to the second end of each chute; the closure comprising:
      a sealing component detachably coupleable to the second end of the chute; and
      an activator mounted to the sealing component, the activator has an elongated geometry to couple to the at least one chute at a connection port of the at least one chute and extend through the sealing component, wherein the activator activates the vacuum device in response to a pre-defined condition.

2. The vacuum laundry chute system of claim 1, wherein the receptacle comprises a divider to separate the vacuum device from the cavity for receiving the one or more articles of clothing, wherein the divider allows air to pass from the cavity to the vacuum device.

3. The vacuum laundry chute system of claim 2, wherein the divider comprises a grate.

4. The vacuum laundry chute system of claim 1, wherein the receptacle further comprises a window aligned with the cavity for receiving the one or more articles of clothing.

5. The vacuum laundry chute system of claim 1, wherein the vacuum device generates negative pressure in response to the pre-defined condition.

6. The vacuum laundry chute system of claim 1, wherein the vacuum device generates positive pressure to clear a blockage in the chute in response to a pre-defined condition.

7. The vacuum laundry chute system of claim 1, further comprising at least one indicator mounted to the sealing component, wherein the indicator indicates a status of one or more components of the system.

8. The vacuum laundry chute system of claim 1, wherein the receptacle further comprises control circuitry to send a signal to or receive a signal from at least one of the vacuum device, the activator, and the at least one indicator.

9. A laundry handling method comprising:
   activating a vacuum device in response to a pre-defined condition;
   applying a negative pressure to a chute system with the vacuum device;
   receiving laundry at a closure structure of the chute system, the closure structure comprising an activator having an elongated geometry to couple the activator to a chute of the chute system at a connection port of the chute and extend the activator through the closure structure;

maintaining the negative pressure with the vacuum device to draw the laundry from the closure structure of the chute system to a cavity for receiving the laundry, wherein the cavity comprises a door sealable in response to the activation of the vacuum device;

receiving the laundry at the cavity; and releasing the door of the cavity, in response to a deactivation of the vacuum device, to vacate, from the cavity, the laundry received at the cavity.

10. The laundry handling method of claim 9, further comprising displaying a status of one or more components of the chute system via an indicator at the closure structure.

11. The laundry handling method of claim 9, wherein the pre-defined condition comprises a signal generated in response to an input at the activator mounted on the closure.

12. The laundry handling method of claim 9, further comprising separating the laundry with the cavity from the vacuum device with a divider.

13. The laundry handling method of claim 9, further comprising displaying a content of the cavity through a window aligned with the cavity.

14. The laundry handling method of claim 9, wherein the deactivation of the vacuum device occurs in response to a deactivation condition.

15. The laundry handling method of claim 14, wherein the deactivation condition comprises an expiration of a timer.

16. The laundry handling method of claim 14, wherein the deactivation condition comprises an input at the closure structure.

17. A computer program product for laundry handling, the computer program product comprising a computer readable storage medium having program instructions embodied therewith, the program instructions readable/executable by a processor to cause the processor to:

activate a vacuum device, in response to a predefined condition, to apply a negative pressure to a chute system;

detect laundry introduced at a closure structure of the chute system with a modular wand activator mounted at the closure structure, the modular wand activator having an elongated geometry to couple to a chute of the chute system at a connection port of the chute and extend through the closure structure;

maintain the negative pressure with the vacuum device to draw the laundry from the closure structure to a cavity for receiving the laundry, wherein the cavity comprises a door sealable in response to the activation of the vacuum device;

detect receipt of the laundry at the cavity; and deactivate the vacuum device in response to detection of the receipt of the laundry at the cavity.

18. The computer program product of claim 17, wherein the processor is further to display a status of one or more components of the chute system at an indicator of the closure structure.

19. The computer program product of claim 17, wherein the pre-defined condition comprises an input at the closure.

20. The computer program product of claim 17, wherein the pre-defined condition comprises the detection of the laundry introduced at the closure structure.

* * * * *